United States Patent [19]

Hindle

[11] 4,225,012

[45] Sep. 30, 1980

[54] SAFETY CLAMP DEVICE AND APPARATUS UTILIZING SAME

[75] Inventor: Durward J. Hindle, Redwing, Minn.

[73] Assignee: International Telephone and Telegraph Corporation, New York, N.Y.

[21] Appl. No.: 28,045

[22] Filed: Apr. 6, 1979

[51] Int. Cl.[2] .......................... E05G 3/10; F16G 11/00

[52] U.S. Cl. .................................. 182/112; 24/134 N; 188/65.2; 182/142

[58] Field of Search ........................ 182/112, 5, 6, 7, 3; 188/65.2, 65.1; 24/134 N, 134 L

[56] References Cited

U.S. PATENT DOCUMENTS

| | | | |
|---|---|---|---|
| 2,939,550 | 6/1960 | Puttre | 188/65.1 |
| 3,386,530 | 6/1968 | Thompson | 182/112 |
| 3,586,125 | 6/1971 | Durand | 182/112 |
| 3,797,608 | 3/1974 | Virdis | 182/112 |
| 4,034,828 | 7/1977 | Rose | 188/65.2 |

*Primary Examiner*—Reinaldo P. Machado
*Attorney, Agent, or Firm*—James B. Raden; Donald J. Lenkszus

[57] ABSTRACT

An improved safety clamp device for use with movable platforms and the like includes a body member having a safety cable receiving cradle, a lever arm having a safety cable engaging portion, an elongate member carrying a pulley at either end, and a control arm. The control arm is in the form of a modified bellcrank having one arm portion pivotally connected to the body member, its apex connected to the elongate member and a pulley connected to a second arm portion. The lower end of the elongate member is rigidly connected to the movable platform. A drive or support cable passes on one side of the two pulleys on the elongate member and on the other side of the control arm pulley. The elongate member is maintained in a first position relative to the body member such that the safety cable engaging portion confronts but does not engage the safety cable when the drive or support cable is subjected to a predetermined tension. When the drive or support cable is subjected to less than the predetermined tension, the elongate member is maintained in a second position relative to the body member wherein the safety cable engaging portion engages the safety cable thereby wedging the safety cable against the receiving cradle.

27 Claims, 5 Drawing Figures

SAFETY CLAMP DEVICE AND APPARATUS UTILIZING SAME

CROSS REFERENCE TO RELATED APPLICATION

Safety clamp device and apparatus using same, Ser. No. 914,277, filed June 9, 1978 by James H. Bassett and Paul L. King, and assigned to the same assignee of the present invention.

BACKGROUND OF THE INVENTION

1. Field of the Invention

This invention pertains in general to safety apparatus for movable platforms and the like and in particular to a safety clamp device adapted to be releasably mounted on an upright safety cable and affixed to a movable platform supported by a supporting hoist line whereby a supporting hoist line failure results in the load supported thereby being transferred to the safety cable. The invention also pertains to a particularly advantageous arrangement of such a safety clamp device, a movable load such as a platform, a motor drive unit and hoist and safety lines.

2. Description of the Prior Art

U.S. Pat. No. 3,386,530 issued June 4, 1968 to H. L. Thompson teaches a safety clamp device adapted to be slidably mounted on an upright safety cable and connected to a supporting hoist line which is attached to and interchangeably raises and lowers a movable platform. That safety device comprises a body member having an upright safety cable receiving cradle and a pair of spaced apart sidewalls extending outwardly therefrom. Each sidewall has an engaging edge of a predetermined length opposite the cradle. A lever arm sandwiched between the sidewalls is pivotally mounted on the body member for pivotal movement about an axis transverse to the direction of travel of the body member relative to the safety cable. The lever arm member is shiftable between a safety cable engaging position and a safety cable release position. The lever arm includes a safety cable engaging portion adapted to engage the safety cable in the safety cable engaging position. Elongate bar members are pivotally attached to the lever arm at the end opposite the safety cable engaging portion. A hoist line is attached to the upper end of the bar members and the safety platform is attached to the lower end. In the normal release position, the elongate bar members are positioned substantially upright and confront the parallel engaging edges of the sidewalls whereby the cable engaging portion of the lever arm is urged to the release position. In the event of hoist line failure, the elongate arms will shift downward thereby urging the lever arm downward and the cable engaging portion will engage the safety cable thereby clamping the safety cable against the cable receiving cradle of the body member and preventing downward movement of the safety device on the safety cable and arresting downward movement of the platform.

One disadvantage of a safety clamp device as described above is that when the movable platform is being raised or lowered, the body member may pivot and not slide parallel to the safety cable, i.e., it may on occasion cock in a nonparallel position, and therefore will not slide freely along the safety cable. Also under such conditions, wear of the safety cable or of the safety device may occur.

In a prior improvement over the safety clamp device of U.S. Pat. No. 3,386,530, an "L" shaped member or modified bellcrank has one arm pivotally connected to the hoist line, and the apex between the two arms is pivotally connected to the elongate member and the other arm is sandwiched between the sidewalls of the body member. The other arm is allowed to slide between the sidewalls and is adapted such that its lower edge may ride on a stop pin carried by the two sidewalls.

This device also has the disadvantage that it can pivot thereby causing drag and wear. It has a further disadvantage in that the free arm of the bellcrank can improperly wedge under the stop pin.

Although the two aforementioned safety clamp devices are intended for use with movable platforms, neither is particularly well adapted for use with movable platforms of the type having a hoist motor or traction drive unit mounted on the movable platform. Previously, a workman would rely on a lifeline which was fastened to his belt at one end and tied off to the building at its other end.

Safety clamp devices are also shown or described in U.S. Pat. Nos. 3,586,125 and 3,302,750.

Other safety clamp devices are taught or shown in the following U.S. Pat. Nos.: 3,006,431; 3,179,994; 3,317,971; 3,598,200; 3,852,943; Des 180,093 and Des 199,198. However, none of the safety clamp devices shown in these patents are adapted for use with a movable platform.

It is one object of the invention to provide an arrangement whereby a safety clamp device may be arranged in combination with a movable platform such that a workman may tie his lifeline to the movable platform with an assurance of safety.

It is another object of the invention to provide a safety clamp device which will sense tension in a support or hoist line and automatically engage a safety line when loss of tension is sensed.

It is still another object of the invention to provide a safety clamp device which does not require readjustment of the safety line each time the platform is moved.

It is a further object of the invention to provide a safety clamp device suitable for use with multiple or stacked platforms where men on lower platforms are not aided by lifelines tied to a building or other structure.

SUMMARY OF THE INVENTION

The present invention is directed to an improvement over the safety clamp device of the above-identified copending Bassett et al application and as a further improvement over the safety device clamp of the aforementioned U.S. Pat. No. 3,386,530.

A safety clamp device in accordance with the principles of the invention includes a body member having a safety cable receiving cradle; a lever arm pivotally connected to the body member and pivotally connected to an elongate member carrying first and second pulleys and having its lower end connected to the movable load; a safety cable engaging means; and a control arm pivotally connected at one end to the body member, pivotally connected to the elongate member and carrying a third pulley intermediate the first and second pulleys. A drive or support cable for the movable load is threaded between the pulleys such that when the cable is under tension, the elongate member is forced to a first position relative to the body member and when the cable is tensioned below a predetermined level, the elongate member assumes a second position relative to the body member. When the elongate member is in the first position relative to the body member, the safety cable engaging means confronts but does not engage the safety cable. When the elongate member is in the second position relative to the body member, the safety cable engaging means engages the safety cable and the safety cable is thereby wedged between the safety cable receiving cradle and the safety cable engaging means.

In accordance with the principles of the invention, the control arm and the lever arm operate cooperatively to maintain the body member and the elongate bar member in substantially parallel relationships to each other for any relative positions between the body member and the elongate member.

In one embodiment of the invention, the control arm is in the form of a modified bellcrank and the pivotal connection to the elongate member is at approximately the apex of the modified bellcrank. One arm of the modified bellcrank is adapted to be pivotally connected to the body member and the other arm carries the third pulley.

Further in accordance with the invention, a movable platform arrangement includes a safety clamp device having the elongate member coupled at its lower end to the movable platform. The movable platform is adapted to ascend and descend a hoist or lift line threaded over the three pulleys.

In accordance with the principles of the invention, the safety clamp device senses loss of tension in the hoist or lift line and in the event such loss of tension is sensed, the safety line is engaged to prevent downward movement of the platform.

BRIEF DESCRIPTION OF THE DRAWINGS

The invention may be better understood from a reading of the detailed description taken in conjunction with the drawings in which like reference numerals designate like parts in the several views and in which.

DETAILED DESCRIPTION OF THE DRAWINGS

Figure 1:
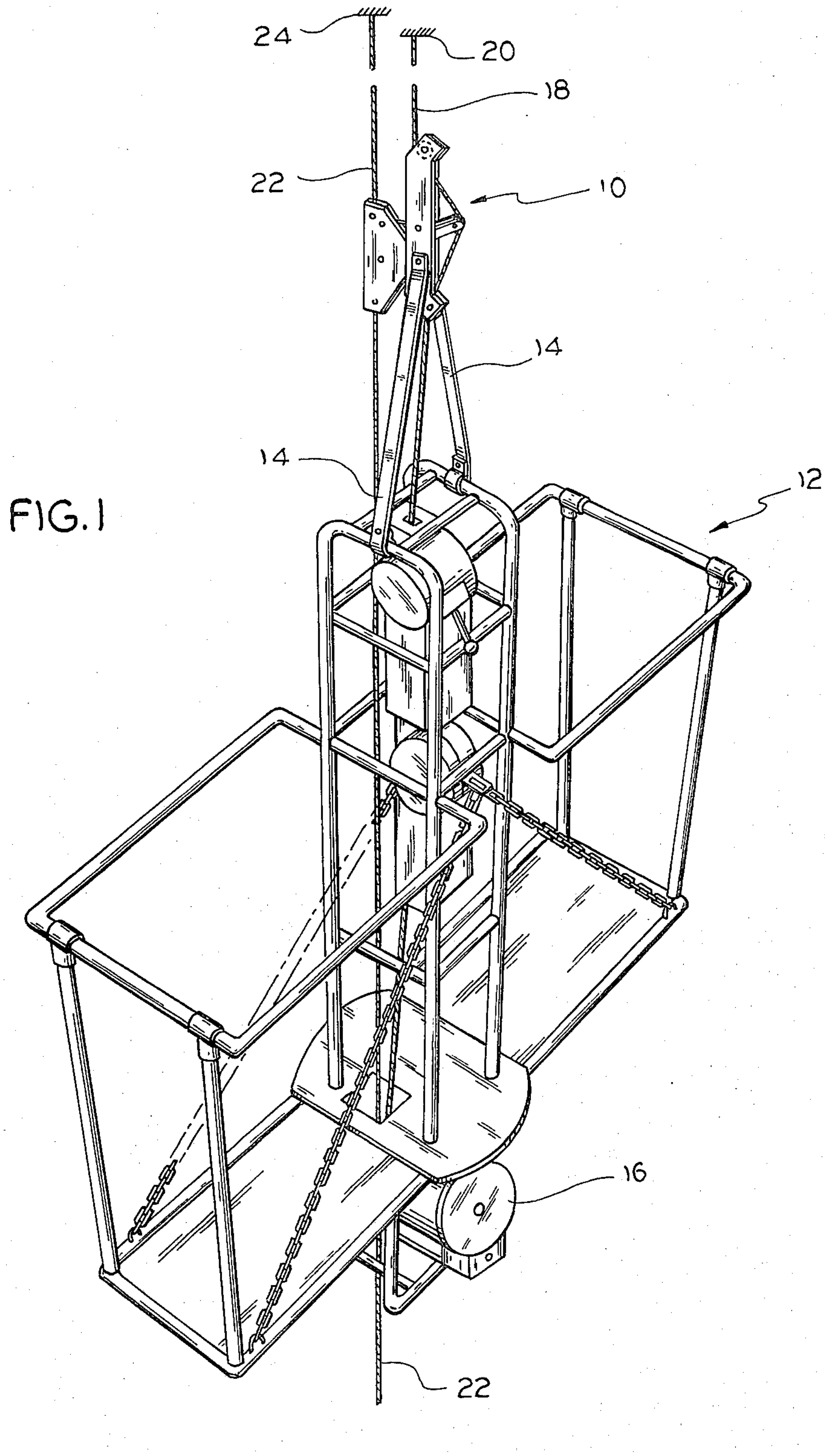
FIG. 1 is a diagrammatic view illustrating a typical usage of the platform safety device of the invention.

The safety device is indicated, in general, by numeral 10 in FIG. 1 wherein a typical scaffold 12 is shown. The scaffold is of the type including a motorized hoist 16 which climbs or descends a hoist cable 18 which in turn is connected to a cable support indicated symbolically at 20. A safety clamp device 10 through which the hoist cable passes is connected to the scaffold by means of rigid straps 14. A safety line 22 is supported at one end by a cable support shown symbolically at 24 and passes through the safety device 10.

It should be noted that although but one embodiment of the invention is shown, the safety clamp device may be advantageously employed with loads other than platforms such as bosun chairs, buckets, and general crane loads. Accordingly, the term "movable platform" is defined as including movable platforms, scaffolding, personnel and material hoists, construction tiered platforms, overhead crane loads, crane buckets and the like.

Figure 2:
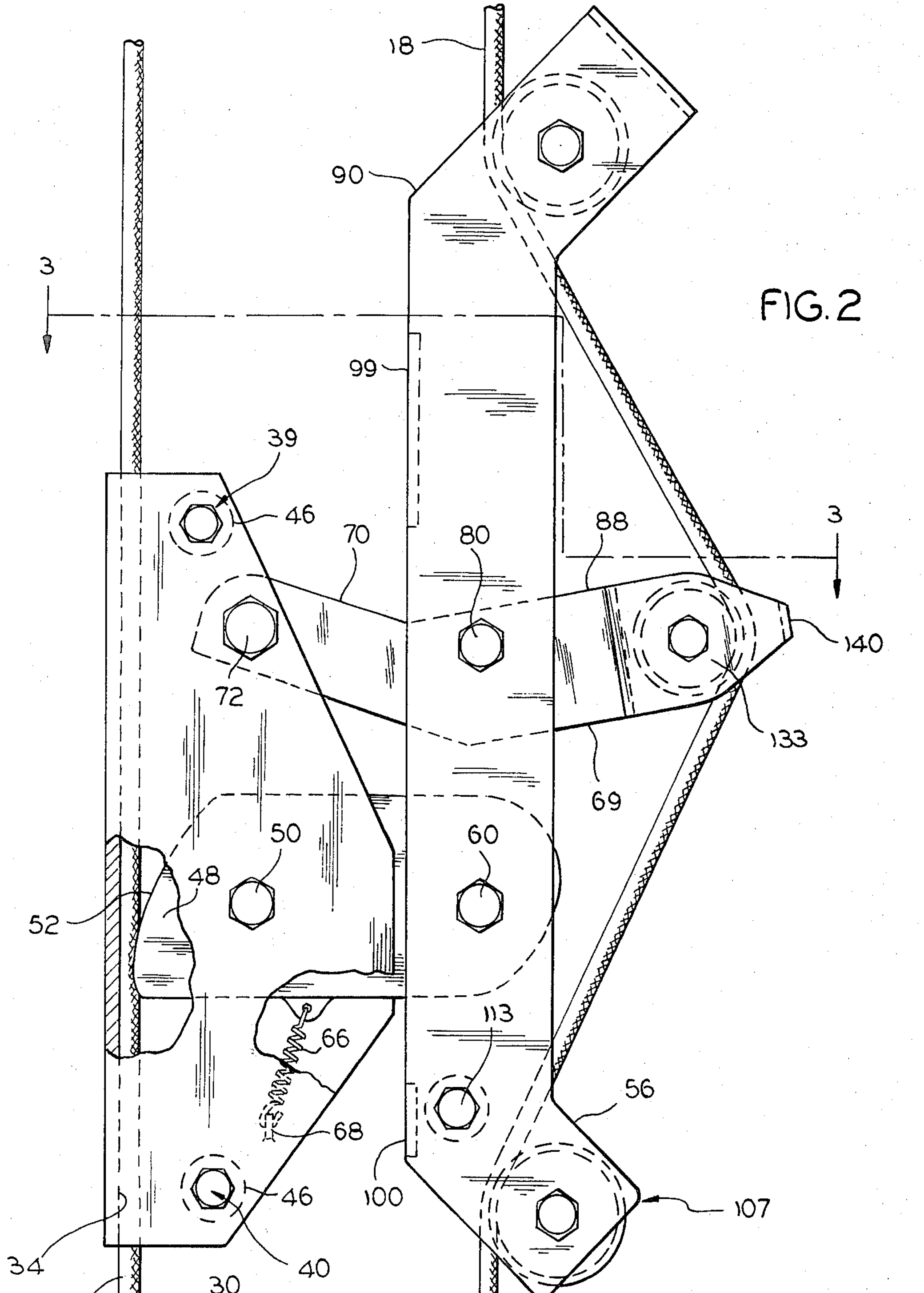
FIG. 2 is a side elevation of the safety device of the invention in a locked position after hoist line failure.
Figure 3:
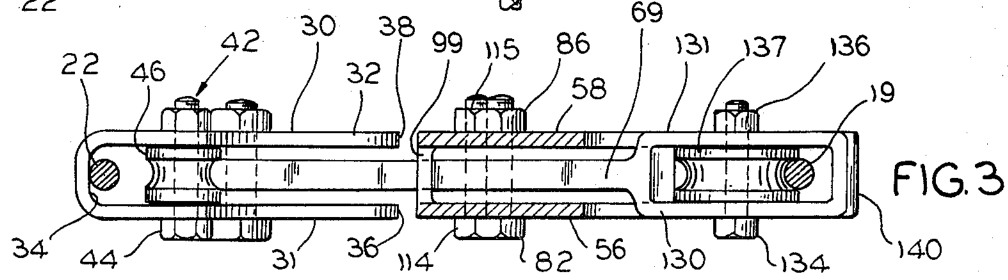
FIG. 3 is a top view of a body member of the safety device taken along line 3—3 of FIG. 2.
Figure 4:
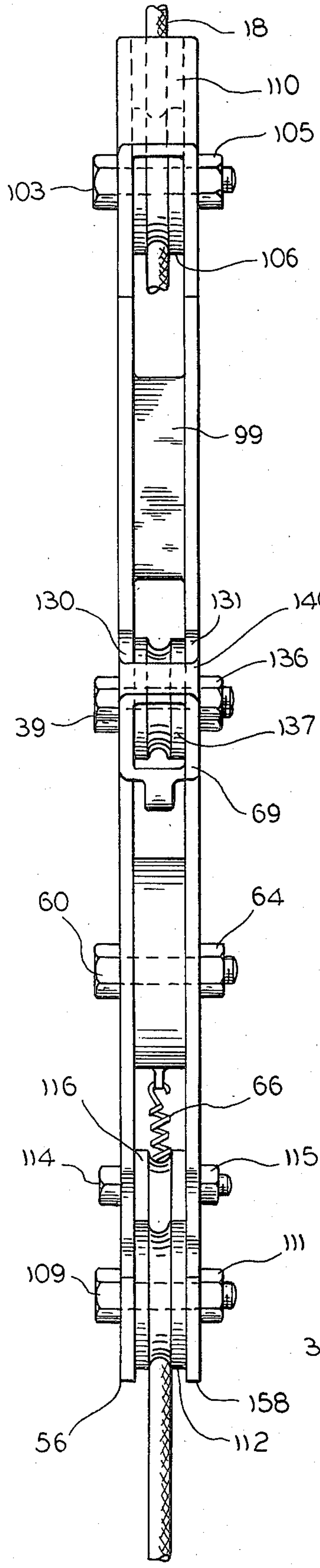
FIG. 4 is a right hand view of the safety device of FIG. 2.

Turning now to FIGS. 2, 3 and 4, the safety clamp device 10 includes a body member 30 having opposed parallel upright sides 31 and 32 spaced apart a predetermined distance. Body member 30 further includes an upright safety cable engaging cradle 34 of substantially semi-circular transverse cross-section adapted to receive safety cable 22 for slidable movement therein. The body member is constructed from rigid steel material bent to form the safety cable engaging cradle 34. The cradle 34 is thus of integral construction with the body member 30. The body member 30 further includes a pair of substantially upright parallel bar engaging edges 36 and 38 positioned on sides 31 and 32, respectively. The body member 30 includes two pairs of apertures, each pair positioned therein in registry, between the edge portions 36 and 38 and the upright cradle portion 34. One pair of the apertures is disposed in the top portion of the body member 30, and the other pair of apertures is disposed in a bottom portion thereof. The upper and lower pair of apertures are adapted to receive safety cable members 39 and 40, respectively. Each safety cable guide members 39 and 40 includes a bolt guide member 42 which passes through the walls 31 and 32 transverse to the direction of travel of the body member 30 on the safety cable. The safety cable 22 is thereby retained in cradle portion 34. Each bolt guide member 42 includes a threaded bolt having a nut 44 thereon and include a roller 46 rotatably mounted on the bolt whereby the cable 22 freely passes over the rollers 46.

A lever arm member 48 is pivotally attached to body member by a shouldered bolt or lever arm body pivot member 50 which passes through apertures in the sides 31 and 32 and through an aperture in the lever arm member 48 such that the lever arm member 48 is sandwiched between the sides 31 and 32 for pivotal movement about an axis transverse to the direction of travel of the body member 30 relative to the safety cable 22. The body pivot member 50 includes a bolt 51, a washer and a nut threaded onto the bolt.

Figure 5:
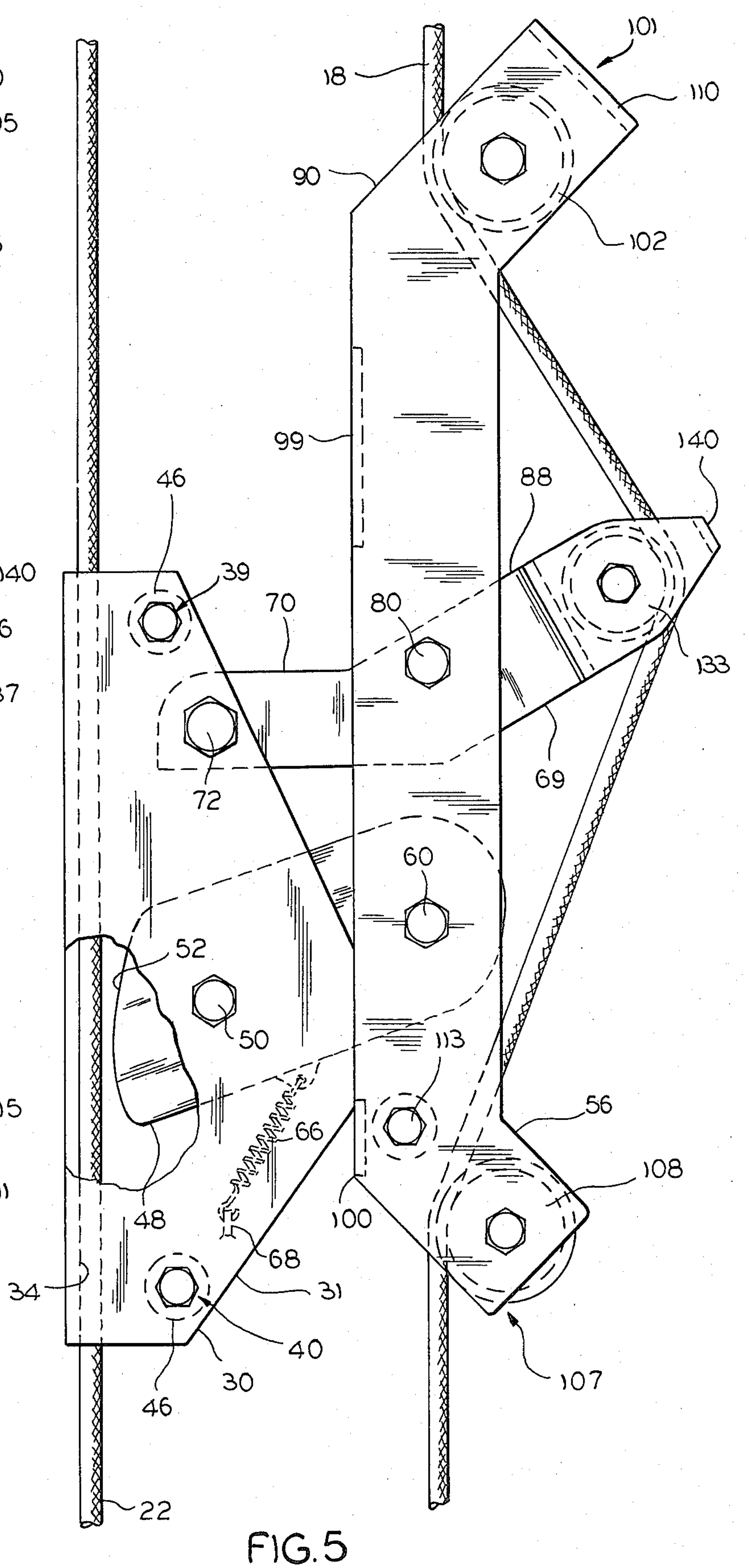
FIG. 5 is a side elevation of the platform safety device in the riding position and shows connecting linkages.

Lever arm member 48 includes a safety cable engaging portion 52 which in the release position shown in FIG. 5, confronts but does not engage the cable 22. Lever arm 48 includes an aperture therein, whereby a shouldered bolt or lever arm bar pivot member shown generally at 54 may be received for mounting the lever arm 48 between parallel bar members 56 and 58 of elongate member 90. A bolt 60 is passed through an aperture of bar member 58, the aperture of lever arm 48, and a corresponding aperture of bar member 56. A nut 64 is threaded onto the bolt. The lever arm 48 may thus rotate on the bolt 60 about an axis which is transverse to the direction of travel of the body member 30 on the safety cable 22.

A spring or bias member 66 is secured to lever arm 48 at one end and to the body member 30 at its other end via cotter pin 68 such that it is sandwiched between the sidewalls 36 and 38. The spring 66 has a predetermined tension which aids in urging the lever arm 48 to a position such that the cable engaging portion 52 will more quickly engage the cable 22 in response to equipment failure.

The elongate member 90 includes wall portions 99, 100 and 110 connecting bar members 56 and 58. Each end of the bar member 90 includes an angled portion.

The upper angle portion 101 includes a pair of apertures positioned in registry and adapted to receive hoist cable roller assembly 102. The hoist cable roller assembly 102 includes a bolt 103 which passes through the bar members 56 and 58 and has a nut 105 thereon. A roller or pulley wheel 106 is rotatably mounted on the bolt 103 whereby the hoist cable 18 freely passes thereover. Similarly, the lower angle portion 107 includes a pair of apertures positioned in registry and adapted to receive hoist cable roller assembly 108. The hoist cable roller assembly 108 includes a bolt 109 which passes through the bar members 56 and 58 and has a nut 111 thereon. A roller or pulley wheel 112 is rotatably mounted on the bolt 109 whereby the hoist cable 18 freely passes thereover. Another pair of apertures positioned in registry are provided in the elongate member 90 and are adapted to receive hoist cable guide member 113. The hoist cable guide member 113 includes a threaded bolt 114 having a nut 115 thereon and includes a roller 116 rotatably mounted on the bolt 114. The hoist cable guide member serves to retain the hoist cable 18 between elongate bar members 56 and 58 and to thereby prevent the cable 18, when slack, from becoming entangled with the elongate member 90.

A control arm 69 includes a linking arm portion 70 sandwiched between the sidewalls 31 and 32 and pivotally connected to the upper portion of body member 30 by means of a pivot member 72. Pivot member 72 includes a bolt member which passes through corresponding apertures in sidewalls 31 and 32 and in an end portion of linking arm 70 and which is secured by a washer and a threaded nut. The control arm 69 may thereby rotate about an axis which is substantially transverse to the direction of travel of the body member 30 on the upright safety cable 22.

A second linking arm portion 88 is integrally formed with the linking arm 70 such that an obtuse angle is formed therebetween. The shape of the control arm 69 may be referred to as a modified bellcrank.

The linking arm 88 includes two parallel flanges 130 and 131. Each of the flanges 130, 131 includes an aperture in registry with each other and adapted to receive a hoist cable roller assembly 133. The hoist cable roller assembly 133 includes a bolt 134 secured by nut 136. A roller or pulley wheel 137 is rotatably mounted on the bolt 134 whereby hoist cable 18 freely passes thereover. The flanges 130 and 131 are connected together by a nose piece 140 which serves to retain cable 18 between the flanges 130 and 131 when the cable is slack.

The control arm 69 is pivotally connected to and sandwiched between the elongate bar members 56 and 58 by pivot means 80 comprising a bolt 82 which passes through apertures in elongate bar members 56 and 58 and in control arm 69 and which is secured by nut 86.

The safety clamp device may be assembled in an arrangement such as shown in FIG. 1. The elongate bar members 56 and 58 may be connected to a scaffold by means of rigid straps 14 connected to the elongate bar members via bolt assembly 114.

With the scaffold suspended beneath the safety device, the safety device is maintained in the position shown in FIG. 5. The tension in hoist line 18 acts on control arm 69 such that roller 137 is urged toward elongate member 90. As roller 137 is drawn toward member 90, control arm 69 pivots and elongate member 90 is drawn toward body member 30. The pivotally connected lever arm 48 also pivots such that elongate bar members 56 and 58 are maintained in parallel engagement with edges 36 and 38 respectively of the sidewalls 31 and 32. In this position, the safety cable engaging portion 52 of the lever arm 48 confronts but does not engage safety cable 22. The body member 30 is maintained parallel to the safety cable 22 and thus, will freely ride vertically along the safety cable 22.

The parallel movement of bar member 90 relative to body member 30 is most advantageously obtained by arranging the lever arm 48 pivotal points and control arm 69 pivotal points such that the distance between pivotal points 72 and 80 is equal to the distance between pivotal points 50 and 54 and further that the distance between pivotal points 50 and 72 is equal to the distance between pivotal points 54 and 80.

Failure of the hoist line 18 or motor hoist unit results in the hoist line becoming substantially untensioned. The hoist line 18 no longer urges control arm 69 toward the elongate member 90 and control arm 69 becomes free to pivot. The weight of the scaffold will pull elongate member 90 downward and spring 66 will act to pull lever arm 48 downward. The combined effect of the forces results in elongate member 90 moving downward relative to body member 30. The control arm 69 and lever arm 48 will pivot such that elongate member 90 is moved parallel to body member 30. More importantly, as lever arm 48 pivots, safety cable engaging portion 52 will contact and exert considerable pressure on safety cable 22 thereby wedging cable 22 against cable receiving cradle 34 and preventing downward movement of the platform 12. The weight of the platform 12 will maintain the locking action as described hereinabove. It should be noted that the parallel elongate bar members 56 and 58 no longer contact the edges 36 and 38.

By means of the pivotal actions of the lever arm 48 and arm 70 of the modified bellcrank 88, the elongate bars 56 and 58 are maintained in parallel relationship with the edges 36 and 38, respectively.

Thus, the safety clamp of the invention senses tension of the hoist line to immediately stop downward movement of the platform in the event there is hoist line failure or if there is failure of the motorized hoist unit. It should be noted that the immediate clamping action prevents any substantial downward movement of the movable platform before stopping occurs thereby preventing subsequent jerking movement of the platform.

It will be understood that various changes may be made in the form, details, arrangement and proportions of the various parts without departing from the spirit and scope of the invention.

What is claimed is:

1. A safety clamp device adapted to be slidably mounted on an upright safety cable and adapted to be connected to a movable platform raised and lowered by means of a hoist cable, said safety device comprising:
   - a body member having a cable receiving cradle adapted to receive said safety cable;
   - a lever arm shiftably mounted on said body member for movement about an axis transverse to the slidable movement of said body member relative to said safety cable, said lever arm shiftable between a safety cable engaging position and a safety cable release position;
   - safety cable engaging means for engaging said safety cable when said lever arm is in said engaging position;
   - an elongate member pivotally attached to said lever arm, said elongate member carrying a first roller at one end and a second roller at the other end, said first and second rollers being adapted to engage said hoist cable;

a control arm pivotally attached at one end to said body member, carrying a third roller at the other end, and pivotally attached to said elongate member intermediate said first pivot means and said third roller, said first roller being adapted to engage said hoist cable and said control arm;

said hoist cable being threaded over said first, second, and third rollers;

said control arm operating to maintain said elongate member in a first upright position to, in turn, maintain said lever arm in said release position in response to said cable being tensioned;

said elongate member adapted to shift to a second upright position to urge said lever arm to said engaging position in response to said cable having less than a predetermined tension; and said lever arm and said control arm cooperatively acting to maintain said cradle in parallel relationship to said elongate member when said elongate member is in said first upright position.

2. A safety clamp in accordance with claim 1, wherein said control arm includes first and second arms integrally formed as a modified bellcrank.

3. A safety clamp in accordance with claim 2, wherein said modified bellcrank maintains said bar member in said first upright position when a first predetermined force is applied to said second arm.

4. A safety clamp in accordance with claim 3, wherein said second arm includes a pair of parallel spaced-apart flanges, and said third roller is rotatably mounted between said pair of flanges.

5. A safety clamp in accordance with claim 4, wherein said second arm includes means adapted to guide and retain said safety cable between said pair of flanges.

6. A safety clamp in accordance with claim 1, further including at least one cable guide member on said body member adapted to guide and retain said safety cable in said cradle.

7. A safety clamp in accordance with claim 1, wherein said body member includes a pair of spaced apart sidewalls extending outwardly from said cradle whereby said safety cable may be positioned between said sidewalls to position said safety cable in said cradle.

8. A safety clamp in accordance with claim 7, wherein said lever arm is positioned between said sidewalls and is pivotally connected thereto.

9. A safety clamp in accordance with claim 8, wherein said sidewalls each include an upright bar engaging edge adapted to engage said elongate member when said elongate member is in said first upright position.

10. A safety clamp in accordance with claim 1, including a pair of parallel spaced apart elongate bar members pivotally attached to said lever arm and sandwiching said lever arm therebetween.

11. A safety clamp in accordance with claim 1, further comprising a bias means connected to said body member and said lever arm.

12. A safety clamp device adapted to be slidably mounted on an upright hoist cable for raising and lowering a movable platform and adapted to be slidably mounted on an upright safety cable and further adapted to grip said safety cable when said hoist cable is subjected to less than a predetermined tension, said device comprising:

a body member having a cable receiving cradle adapted to receive said safety cable;

a lever arm shiftably mounted on said body member for movement about an axis transverse to the slidable movement of said body member relative to said safety cable, said lever arm shiftable between a safety cable engaging position and a safety cable release position;

safety cable engaging means for engaging said safety cable when said lever arm is in said engaging position;

an elongate member pivotally connected to said lever arm;

means for coupling said elongate member to said movable platform;

tension sensing means for shifting said elongate member to a first upright position to urge said lever arm to said release position when said hoist cable is subjected to greater than a predetermined tension and for shifting said elongate member to a second upright position to urge said lever arm to said engaging position when said hoist cable is subjected to less than said predetermined tension;

said tension sensing means comprising a first roller means rotatably mounted at one end of said elongate member for engaging said hoist cable, a second roller means rotatably mounted at the other end of said elongate member for engaging said hoist cable, and a control arm having a first pivotal connection at one end portion to said body member and carrying a third rotatably mounted roller means at another end portion, said control arm including a second pivotal connection to said elongate member intermediate said first pivotal connection and said third roller means; and said hoist cable being threaded over said first, second and third roller means such that when said hoist cable is subjected to greater than said predetermined tension, said other end portion is urged toward said body member and said control arm urges said elongate member to said first upright position.

13. A safety clamp device in accordance with claim 12, wherein said control arm includes first and second integrally formed arms forming an obtuse angle therebetween.

14. A safety clamp in accordance with claim 13, wherein said body member includes a pair of spaced apart sidewalls extending outwardly from said cradle whereby said safety cable may be positioned between said sidewalls to position said safety cable in said cradle, said lever arm is positioned between said sidewalls and pivotally connected thereto, said first arm is positioned between said sidewalls and pivotally connected thereto.

15. A safety clamp in accordance with claim 14, wherein said elongate member includes a pair of parallel spaced apart elongate bar members pivotally attached to said lever arm and pivotally attached to said control arm and sandwiching said lever arm and said bellcrank therebetween.

16. A safety clamp in accordance with claim 15, wherein said body member comprises at least one cable guide means to guide and retain the safety cable in said cradle.

17. Platform apparatus for ascending or descending a hoist cable and for engaging a safety cable to prevent sudden downward movement thereof, said apparatus comprising:

a movable platform;

a platform lifting device;

a safety clamp device slidably mounted on said safety cable, said safety clamp device comprising:

a body member having a cable receiving cradle adapted to receive said safety cable;

a lever arm shiftably mounted on said body member for movement about an axis transverse to the slidable movement of said body member relative to said safety cable, said lever arm shiftable between a safety cable engaging position and a safety cable release position;

safety cable engaging means for engaging said safety cable when said lever arm is in said engaging position;

an elongate member pivotally attached to said lever arm and coupled to said movable platform, said elongate member carrying a first roller at one end and a second roller at the other end, said first and second rollers being adapted to engage said hoist cable;

a control arm pivotally attached at one end to said body member, carrying a third roller at the other end, and pivotally attached to said elongate member intermediate said first pivot means and said third roller, said first roller being adapted to engage said hoist cable and said control arm;

said hoist cable being threaded over said first, second, and third rollers;

said control arm operating to maintain said elongate member in a first upright position to, in turn, maintain said lever arm in said release position in response to said cable being tensioned;

said elongate member adapted to shift to a second upright position to urge said lever arm to said engaging position in response to said cable having less than a predetermined tension; and said lever arm and said control arm cooperatively acting to maintain said cradle in parallel relationship to said elongate member when said elongate member is in said first upright position.

18. Platform apparatus in accordance with claim 17, wherein said control arm includes first and second arms integrally formed as a modified bellcrank.

19. Platform apparatus in accordance with claim 18, wherein said modified bellcrank maintains said bar member in said first upright position when a first predetermined force is applied to said second arm.

20. Platform apparatus in accordance with claim 19, wherein said second arm includes a pair of parallel spaced-apart flanges, and said third roller is rotatably mounted between said pair of flanges.

21. Platform apparatus in accordance with claim 20, wherein said second arm includes means adapted to guide and retain said safety cable between said pair of flanges.

22. Platform apparatus for ascending or descending a hoist cable and for engaging a safety cable to prevent sudden downward movement thereof, said apparatus comprising:

a movable platform;

a platform lifting device;

a safety clamp device connected to said movable platform and adapted to be slidably mounted on said hoist cable and said safety cable and further adapted to grip said safety cable when said hoist cable is subjected to less than a predetermined tension, said device comprising:

a body member having a cable receiving cradle adapted to receive said safety cable;

a lever arm shiftably mounted on said body member for movement about an axis transverse to the slidable movement of said body member relative to said safety cable, said lever arm shiftable between a safety cable engaging position and a safety cable release position;

safety cable engaging means for engaging said safety cable when said lever arm is in said engaging position;

an elongate member pivotally connected to said lever arm;

means for coupling said elongate member to said movable platform;

tension sensing means for shifting said elongate member to a first upright position to urge said lever arm to said release position when said hoist cable is subjected to greater than a predetermined tension and for shifting said elongate member to a second upright position to urge said lever arm to said engaging position when said hoist cable is subjected to less than said predetermined tension;

said tension sensing means comprising a first roller means rotatably mounted at one end of said elongate member for engaging said hoist cable, a second roller means rotatably mounted at the other end of said elongate member for engaging said hoist cable, and a control arm having a first pivotal connection at one end portion to said body member and carrying a third rotatably mounted roller means at another end portion, said control arm including a second pivotal connection to said elongate member intermediate said first pivotal connection and said third roller means; and said hoist cable being threaded over said first, second and third roller means such that when said hoist cable is subjected to greater than said predetermined tension, said other end portion is urged toward said body member and said control arm urges said elongate member to said first upright position.

23. Platform apparatus in accordance with claim 22, wherein said control arm includes first and second integrally formed arms forming an obtuse angle therebetween.

24. Platform apparatus in accordance with claim 23, wherein said body member includes a pair of spaced apart sidewalls extending outwardly from said cradle whereby said safety cable may be positioned between said sidewalls to position said safety cable in said cradle, said lever arm is positioned between said sidewalls and pivotally connected thereto, said first arm is positioned between said sidewalls and pivotally connected thereto.

25. Platform apparatus in accordance with claim 24, wherein said elongate member includes a pair of parallel spaced apart elongate bar members pivotally attached to said lever arm and pivotally attached to said control arm and sandwiching said lever arm and said bellcrank therebetween.

26. Platform apparatus in accordance with claim 25, wherein said body member comprises at least one cable guide means to guide and retain the safety cable in said cradle.

27. Platform apparatus in accordance with claim 22, wherein said elongate member is coupled to said movable platform.

* * * * *